US012764027B2

(12) United States Patent
Karampatsis et al.

(10) Patent No.: US 12,764,027 B2
(45) Date of Patent: Oct. 13, 2026

(54) IMPROVING CONFIDENCE OF NETWORK ANALYTICS USING A DIGITAL TWIN

(71) Applicant: Lenovo (Singapore) Pte. Ltd., New Tech Park (SG)

(72) Inventors: Dimitrios Karampatsis, Ruislip (GB); Emmanouil Pateromichelakis, Viersen (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/730,538

(22) PCT Filed: Mar. 14, 2022

(86) PCT No.: PCT/EP2022/056574
§ 371 (c)(1),
(2) Date: Jul. 19, 2024

(87) PCT Pub. No.: WO2023/138798
PCT Pub. Date: Jul. 27, 2023

(65) Prior Publication Data
US 2025/0150351 A1 May 8, 2025

(30) Foreign Application Priority Data
Jan. 21, 2022 (GR) ................................ 0220100055

(51) Int. Cl.
*H04L 41/14* (2022.01)

(52) U.S. Cl.
CPC .................................... *H04L 41/14* (2013.01)

(58) Field of Classification Search
None
See application file for complete search history.

(56) References Cited

U.S. PATENT DOCUMENTS 11,064,337 B2 * 7/2021 Tofighbakhsh ....... H04W 76/50
2020/0252813 A1 * 8/2020 Li ........................ G06Q 20/382
(Continued)

FOREIGN PATENT DOCUMENTS

WO 2021001007 A1 1/2021

OTHER PUBLICATIONS

PCT/EP2022/056574, "Notification of Transmittal of the International Search Report and the Written Opinion of the International Searching Authority, or the Declaration", International Searching Authority, Oct. 7, 2022, pp. 1-13.
(Continued)

*Primary Examiner* — Ranodhi Serrao
(74) *Attorney, Agent, or Firm* — Kunzler Needham Hilton

(57) ABSTRACT

Apparatuses, methods, and systems are disclosed for improving confidence of network analytics using a digital twin. An apparatus (800) includes a transceiver (825) that receives a request for analytics that includes a threshold minimum confidence level for the analytics and a specified time period for delivering the analytics and a processor (805) that determines a set of additional data to use for satisfying the threshold minimum confidence level available from a set of physical network resources associated with at least one digital twin instance. The transceiver (825) receives the set of additional data from the at least one digital twin instance and delivers the analytics at the specified time period in response to the analytics, derived based on the set of additional data from the at least one digital twin instance, satisfying the threshold minimum confidence level.

17 Claims, 10 Drawing Sheets

(56) References Cited

U.S. PATENT DOCUMENTS

| | | | | |
|---|---|---|---|---|
| 2021/0014141 | A1* | 1/2021 | Patil | H04W 76/25 |
| 2021/0105656 | A1* | 4/2021 | Estevez | H04W 24/08 |
| 2022/0014946 | A1* | 1/2022 | Merwaday | H04W 24/04 |
| 2022/0330083 | A1* | 10/2022 | Kainulainen | H04W 8/04 |

OTHER PUBLICATIONS

5G-ACIA White Paper, "Using Digital Twins to Integrate 5G into Production Networks", 5G Alliance for Connected Industries and Automation, Feb. 2021, pp. 1-48.

3GPP, "3rd Generation Partnership Project; Technical Specification Group Services and System Aspects; Architecture enhancements for 5G System (5GS) to support network data analytics services (Release 17)", 3GPP TS 23.288 V17.2.0, Sep. 2021, pp. 1-196.

* cited by examiner

IMPROVING CONFIDENCE OF NETWORK ANALYTICS USING A DIGITAL TWIN

FIELD

The subject matter disclosed herein relates generally to wireless communications and more particularly relates to improving confidence of network analytics using a digital twin.

BACKGROUND

In certain wireless communication systems, a consumer of a network analytics function can request a specific confidence of analytics and a time to report the analytics, e.g., report analytics within an hour time frame. The request can be a subscription or a one-time request. If the network analytics function cannot report the analytics in the specific time period with the specific confidence level the network analytics function will respond with an error indicating that the analytics cannot be provided. In addition, the network analytics function may indicate to the consumer to end the subscription for analytics. The consumer will then need to query a different network analytics function and identify if such analytics can be provided with the specific requirements.

BRIEF SUMMARY

Disclosed are procedures for improving confidence of network analytics using a digital twin. Said procedures may be implemented by apparatus, systems, methods, and/or computer program products.

In one embodiment, a first method includes receiving a request for analytics associated with a mobile wireless communication network, the request comprising a threshold minimum confidence level for the analytics and a specified time period for delivering the analytics. In one embodiment, the first method includes, in response to determining that the threshold minimum confidence level cannot be met, determining a set of additional data to use for satisfying the threshold minimum confidence level, the set of additional data available from a set of physical network resources. In one embodiment, the first method includes determining that the set of additional data from the set of physical network resources is available from at least one digital twin instance. In one embodiment, the first method includes receiving the set of additional data from the at least one digital twin instance in response to transmitting a request for the set of additional data from the at least one digital twin instance. In one embodiment, the first method includes delivering the analytics at the specified time period in response to the analytics, derived based on the set of additional data from the at least one digital twin instance, satisfying the threshold minimum confidence level.

In one embodiment, a first apparatus includes a transceiver that receives a request for analytics associated with a mobile wireless communication network, the request comprising a threshold minimum confidence level for the analytics and a specified time period for delivering the analytics. In one embodiment, the first apparatus includes a processor that, in response to determining that the threshold minimum confidence level cannot be met, determines a set of additional data to use for satisfying the threshold minimum confidence level, the set of additional data available from a set of physical network resources. In one embodiment, the processor determines that the set of additional data from the set of physical network resources is available from at least one digital twin instance. In one embodiment, the transceiver receives the set of additional data from the at least one digital twin instance in response to transmitting a request for the set of additional data from the at least one digital twin instance. In one embodiment, the transceiver delivers the analytics at the specified time period in response to the analytics, derived based on the set of additional data from the at least one digital twin instance, satisfying the threshold minimum confidence level.

In one embodiment, a second method includes receiving analytics in response to requesting for analytics associated with a mobile wireless communication network, the request comprising a threshold minimum confidence level for the analytics. In one embodiment, the second method includes determining an accuracy of a confidence level of the requested analytics by invoking one or more digital twin instances. In one embodiment, the second method includes determining a set of data available from the one or more digital twin instances for use in verifying the determined accuracy of the confidence level of the requested analytics. In one embodiment, the second method includes receiving the set of additional data from the one or more digital twin instances in response to transmitting a request for the set of additional data from the one or more digital twin instances. In one embodiment, the second method includes verifying the accuracy of the determined confidence level of the requested analytics based on the received set of additional data from the one or more digital twin instances.

In one embodiment, a second apparatus includes a transceiver that receives analytics in response to requesting for analytics associated with a mobile wireless communication network, the request comprising a threshold minimum confidence level for the analytics. In one embodiment, the second apparatus includes a processor that determines an accuracy of a confidence level of the requested analytics by invoking one or more digital twin instances. In one embodiment, the processor determines a set of data available from the one or more digital twin instances for use in verifying the determined accuracy of the confidence level of the requested analytics. In one embodiment, the transceiver receives the set of additional data from the one or more digital twin instances in response to transmitting a request for the set of additional data from the one or more digital twin instances. In one embodiment, the processor verifies the accuracy of the determined confidence level of the requested analytics based on the received set of additional data from the one or more digital twin instances.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
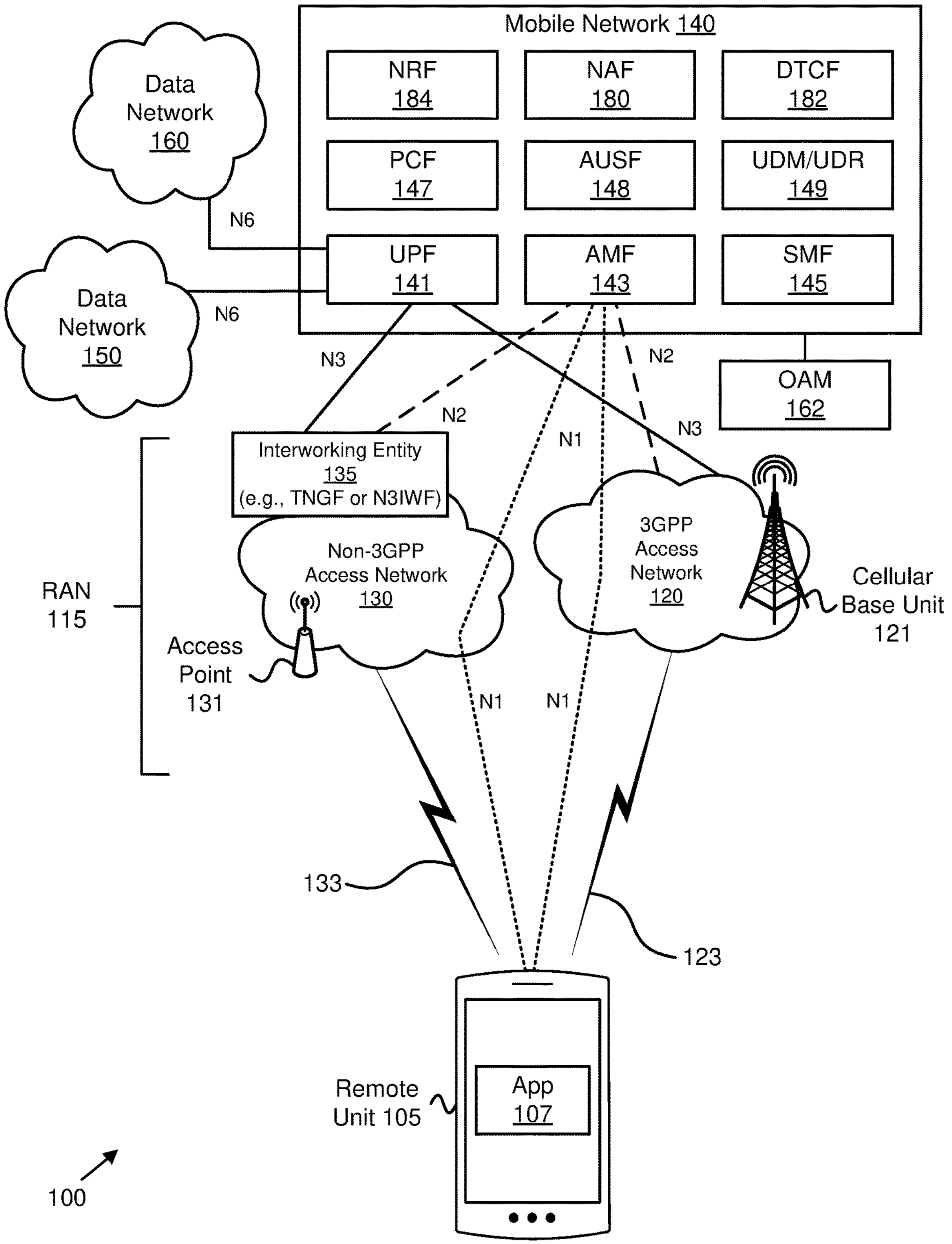
FIG. 1 is a schematic block diagram illustrating one embodiment of a wireless communication system for improving confidence of network analytics using a digital twin.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C"

includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for improving confidence of network analytics using a digital twin. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Digital twins are a new concept that is gaining attention in the tech industry. Supported by artificial intelligence, digital twins allow data-driven networks to utilize the immerse data available in a network and create a "digital mirror" of a physical entity that can run in parallel and simulate the physical entity functions.

Digital twins are already used to some degree in some network deployments. For example, in industrial internet of things ("IIoT") networks, digital twins are used for preventative maintenance where a digital twin of a manufacturing equipment is created in order to predict failure scenarios and estimate the optimal time that the equipment would need to be replaced. A digital twin uses raw data provided by the corresponding physical entity to estimate, predict, forecast, or the like the physical entity's future functions, performance, and/or the like.

Use of digital twins in 5G networks have not been fully addressed and are in the early stages of discussion. However, for example, the IIOT industry in 5G-ACIA has published research on how the industry visualizes a digital twin 5G network. One example is in industrial networks described in 5G-ACIA where a digital twin is used to simulate whether a 5G network can support the time sensitive requirements from an industrial network. 5G-ACIA has defined an 5G Asset Administrator Shell ("AAS") to create digital twins for a 5G network.

5G-ACIA has defined two digital twins for the 5G system a 5G UE digital twin (5G UE AAS) and a 5G network digital twin (5G Network AAS). The 5G Network AAS is able to simulate its performance assuming specific topology, PDU session/QoS flow scenarios. The digital twin uses an AI/ML model to simulate the performance, taking into account raw "live" data from the physical 5G network using a dedicated API.

From the 3GPP perspective, 3GPP has not yet fully evaluated how the Digital Twin paradigm can improve the network operations/functionality. This disclosure addresses how the digital twin paradigm can be used on the network analytics provided by a 3GPP network.

FIG. 1 depicts a wireless communication system 100 for improving confidence of network analytics using a digital twin, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In one embodiment, the mobile core network 140 includes a network analytics function ("NAF") 180 that collects data from UEs, network functions, OAM systems, and/or the like from the mobile network 140, 5G core network ("CN"), and cloud that can be used for analytics related to the wireless communication system 100. Various NAF sources, functions, domains, or the like in 3GPP may be used including management data analytics service ("MDAS"), network data analytics function ("NWDAF"), analytics data application services ("ADAES"), and/or the like, which are described in more detail below.

In one embodiment, the mobile core network 140 may include a digital twin controller function ("DTCF") 182, which allows creation/instantiation of a digital twin of a physical entity, and a network repository function ("NRF") 184, which allows discovery of a DTCF 182, digital twin instances, and/or the like, within the mobile core network 140.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

The Operations, Administration and Maintenance ("OAM") 162 is involved with the operating, administering, managing, and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM 162 may also be involved with provisioning, i.e., the setting up of the user accounts, devices, and services.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In one embodiment, the solution proposed herein may be performed by, for example, a network device that includes a network function, an OAM 162, an application function, a function within an enablement layer, and/or the like. In one embodiment, as described above, network analytics can be provided by different domains in 3GPP. In one embodiment, network analytics may be provided in 3GPP by an MDAS (SA5) that provides data analytics for the network. MDAS can be deployed at different levels, for example, at domain level (e.g., RAN, CN, network slice subnet) or in a centralized manner (e.g., in a PLMN level). The objective of MDAS is to optimize the management plane (in network/domain level, in slice/slice subnet level) by performing analytics based on network management data. Such service can be exposed to the 3$^{rd}$ party/MDAS service consumer to provide performance management ("PM") analytics, fault management ("FM") analytics, network slice instance ("NSI")/network slice subnet instance ("NSSI") analytics, optionally recommend appropriate management actions e.g., scaling of resources, admission control, load balancing of traffic, and/or the like.

In one embodiment, network analytics may be provided in 3GPP by an NWDAF (SA2), provides several analytics services which include the UE/network performance:

i. Observed Service Experience related network data analytics include: Service experience for a UE or a group UEs or any UE in an Application or a set of Applications over a specific user plane ("UP") path (UPF, data network access identifier ("DNAI") and edge computing ("EC") server). The inputs are from application functions ("AF"), NFs and OAM. From UPF the inputs may include: QoS flow bit rate, QoS flow packet delay, number of packet Tx/re-Tx, and/or the like. From AF the inputs may include: quality of experience ("QoE") metrics, service experience, application location, and/or the like.

ii. UE communication analytics (e.g., NWDAF collects UE UL/DL data rate and traffic volume from UPF and N4 session level data).

iii. User data congestion analytics (e.g., NWDAF gets from UPF or AF: UL/DL throughput and peak UL/DL throughput).

iv. Redundant Transmission Experience related analytics (e.g., UL/DL packet delay from UE to UPF).

v. Data Network Performance Analytics (e.g., performance data from AF like Average Packet Delay, Average Loss Rate, and Throughput).

In one embodiment, network analytics may be provided in 3GPP by an ADAES (SA6), provides application data analytics services (stats/predictions) to optimize the application service operation by notifying the application specific layer, and potentially 5GS, for expected/predicted application service parameters changes considering both on-network and off-network deployments (e.g., related to application QoS parameters).

In one embodiment, a consumer of such analytics may request that the analytics (predictions) have a specific confidence level. The network analytics function (either MDAS, NWDAF or ADAES) may not provide analytics to the consumer until the confidence level is reached or satisfied. This may require the network analytics function to use as many samples as possible when collecting raw data from the respective data producer NFs to ensure that the confidence level is reached.

There may be scenarios where the network analytics function may not have enough samples available to reach the confidence level required. In such scenarios, use of digital twins can improve the confidence level by leveraging the digital twin to provide additional samples in order to improve the confidence level of the analytics.

In addition, the network data analytics functions in 3GPP do not have a mechanism defined to identify if the prediction is accurate, e.g., there is no feedback mechanism. Use of digital twins may allow such functions to determine, via a digital twin, if a prediction is accurate by, for example, running simulations of NF load and determine if a predicted NF load at a specific time of day is accurate.

The subject matter disclosed herein addresses the following solutions:

i. How network data analytics functions invoke a digital twin to collect additional data for accurate predictions (embodiment 1);

ii. How a network analytics function or a consumer determines the analytics predictions are accurate (embodiment 2); and iii. How a digital twin is invoked in a network.

In general, the solutions discussed herein support an architecture where a network data analytics function (e.g., NWDAF, MDAS, ADAES) can dynamically trigger digital twin instances to collect additional raw data in order to improve analytics.

A new Digital Twin Controller Function ("DTCF") is proposed to be introduced within the 5G Core Network that allows creation/instantiation of a digital twin of a physical entity. The digital twin can be a physical entity of a complete 5G network, a specific slice (composed of RAN and core network elements), a specific RAN, or a specific core network slice or can be a twin of a specific Network Function type (e.g., AMF type). In one embodiment, the DTCF manages the resources required for the digital twins.

Figure 2:
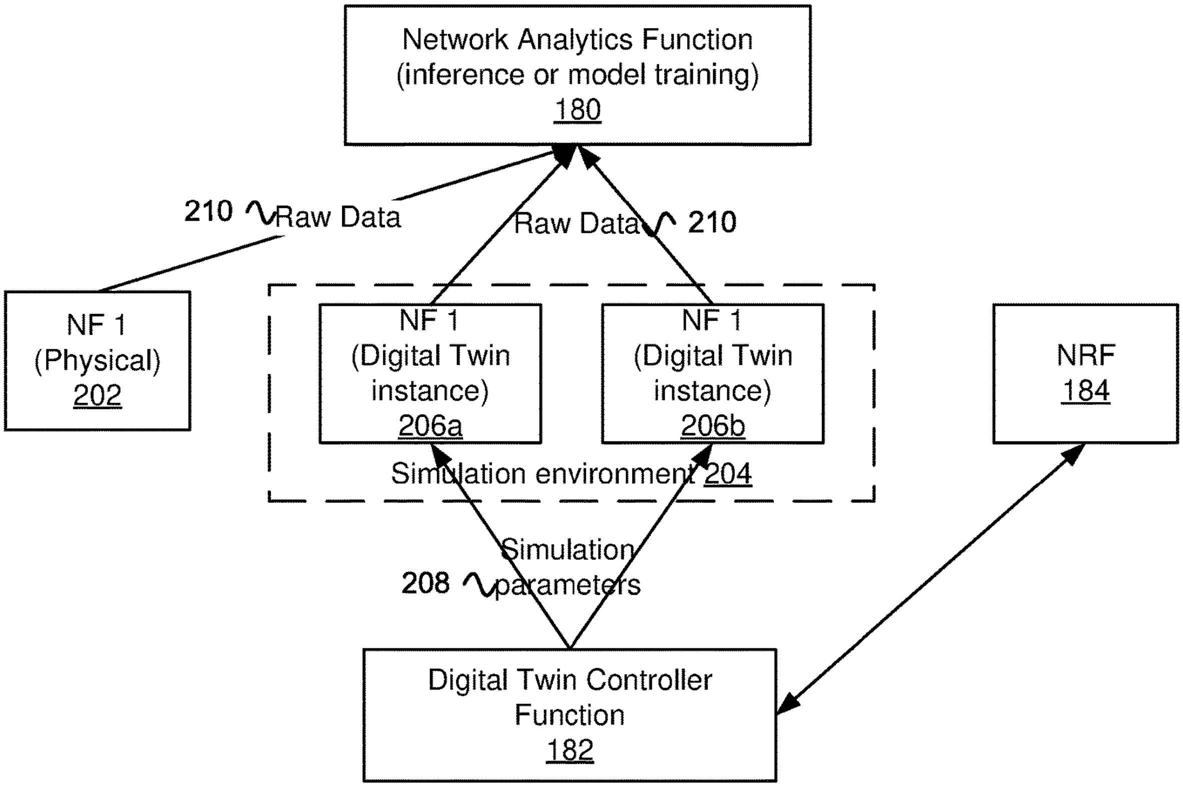
FIG. 2 depicts one embodiment of supporting digital twin instances in 5G core.

FIG. 2 describes the architecture where a specific digital twin NF instance 206, within a simulation environment 204, of a physical NF 202 is created, which allows the network analytics function 180 to retrieve additional data. In one embodiment, a DTCF 182 queries the NRF 184 for the digital twin instances 206 and sends or transmits simulation parameters 208 to the digital twin instance 206. The digital twin instance 206 and the physical NF 202 may send raw data 210, e.g., analytics (actual and/or predicted) to the NAF 180. A digital twin of a UE may also be supported within the simulation environment 204.

In one embodiment, the solutions herein improve the confidence of analytics by collecting additional samples from digital twin instance. In such an embodiment, when a network analytics function determines that additional samples are required to improve the confidence of analytics, the network analytics function requests to identify a digital twin of the physical network function from the DTCF.

The network analytics function, in one embodiment, identifies from the NRF the DTCF that is aware of the required digital twin instance that corresponds to the physical NF associated with the analytics. In one embodiment, the request to the DTCF can include a request to identify a digital twin for a network slice, a request to identify a digital twin for an NF instance, and/or the like.

In one embodiment, the request to the DTCF includes additional parameters (filters) in order for the DTCF to identify the parameters requires to run the digital twin. The parameters may include a number of UEs served, NF load, a number of MM connections (e.g., to an AMF), a number of SM connections (e.g., to an SMF), a number of PDU sessions/QoS flows (e.g., to an SMF/UPF), a deployment or topology (in case a digital twin slice instance is created), and/or a combination of the foregoing.

In one embodiment, the DTCF provides an identifier of the digital twin instance to the network analytics function to allow the function to interface with the digital twin instance to obtain the additional data.

Figure 3:
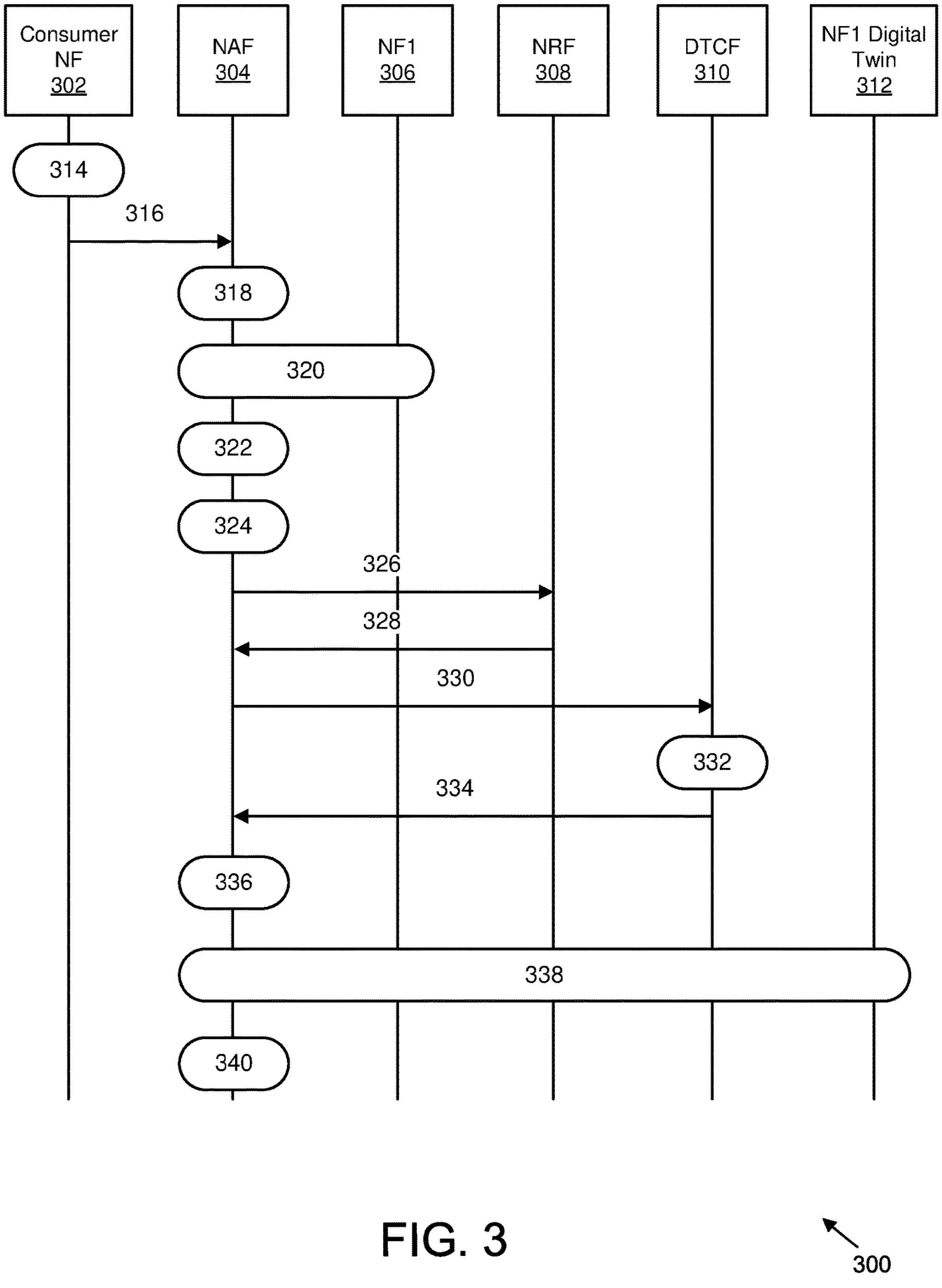
FIG. 3 depicts one embodiment of a procedure flow for improving confidence of network analytics using a digital twin.

FIG. 3 shows the procedure 300 where the analytics function requests a digital twin NF instance to be created. In one embodiment, the same procedure can be re-used for the function to request a digital twin slice instance. In one embodiment, the procedure 300 includes a consumer NF 302, an NAF 304, an NF1 306 (physical NF), an NRF 308, a DTCF 310, and an NF1 Digital Twin 312 (digital twin of physical NF1).

At step 1 (see block 314), in one embodiment, a consumer NF 302 determines that it needs analytics with a specific confidence level.

At step 2 (see messaging 316), in one embodiment, the consumer NF 302 requests analytics from the NAF 304. The request may include a specific confidence level to be reached/satisfied before the NAF 304 provides the analytics. The consumer NF 302 may also include a time period/time frame when these analytics are required for delivery.

At steps 3 and 4 (see blocks 318 and 320), in one embodiment, the NAF 304 collects the data required for the analytics by subscribing to corresponding Event IDs, e.g., as described in 3GPP TS 23.288.

At step 5 (see block 322), in one embodiment, the NAF 304 determines that there are not enough samples, data points, or the like to reach/satisfy the required confidence level at the specific time.

At step 6 (see block 324), in one embodiment, the NAF 304 determines if there are available digital twin instances of the data producer NF instances in order to collect additional samples for the missing data.

At step 7 (see messaging 326), in one embodiment, the NAF 304 interfaces with an NRF 308 to discover a DTCF 310 that has an available digital twin NF instance/slice instance. The NAF 304, in one embodiment, includes in the request the NF type or slice type required for the digital twin.

At step 8 (see messaging 328), in one embodiment, the NRF 308 checks if there is a DTCF 310 that supports the digital twin instance required. The DTCF 310, in one embodiment, registers to the NRF 308 the available digital twin instances, e.g., the DTCF 310 has already configured simulation models for such digital twin instances.

At step 9, (see messaging 330), in one embodiment, the NAF 304 interfaces with the DTCF 310 and requests the DTCF 310 via a new service based interface ("SBI") to run a digital twin instance with specific simulation parameters (e.g., assuming a specific number of UEs served, a specific number of MM or SM sessions active, and/or the like). The NAF 304, in one embodiment, determines the simulation parameters according to the missing data to achieve the required confidence level.

At step 10 (see block 332), in one embodiment, the DTCF 310 runs the digital twin instance according to the simulation parameters At step 11 (see messaging 334), in one embodiment, the DTCF 310 responds to the NAF 304 with an identifier for the digital twin instance.

At step 12 (see block 336), in one embodiment, the NAF 304 maps the digital twin instance ID to the physical instance of the network function 306.

At step 13 (see block 338), in one embodiment, the NAF 304 obtains data from the digital twin instance 312 using a data collection procedure, e.g., the data collection procedure defined in 3GPP TS 23.288. In an alternative embodiment the NAF 304 interacts with the DTCF 310 in order to obtain data for a digital twin instance. In such a scenario, the DTCF 310 interfaces with the digital twin instance with a procedure not described in 3GPP (e.g., a procedure that is implementation based).

At step 14 (see block 340), in one embodiment, the NAF 304 derives analytics with the required confidence level using the additional data obtained from the digital twin instance 312 and sends it to the consumer NF 302.

In one embodiment, the NAF 304 may also request instantiation of a digital twin of a UE to receive missing samples. In such an embodiment, the procedures described in FIG. 3 may be the same except where the NF 306 is replaced by a UE.

Figure 4:
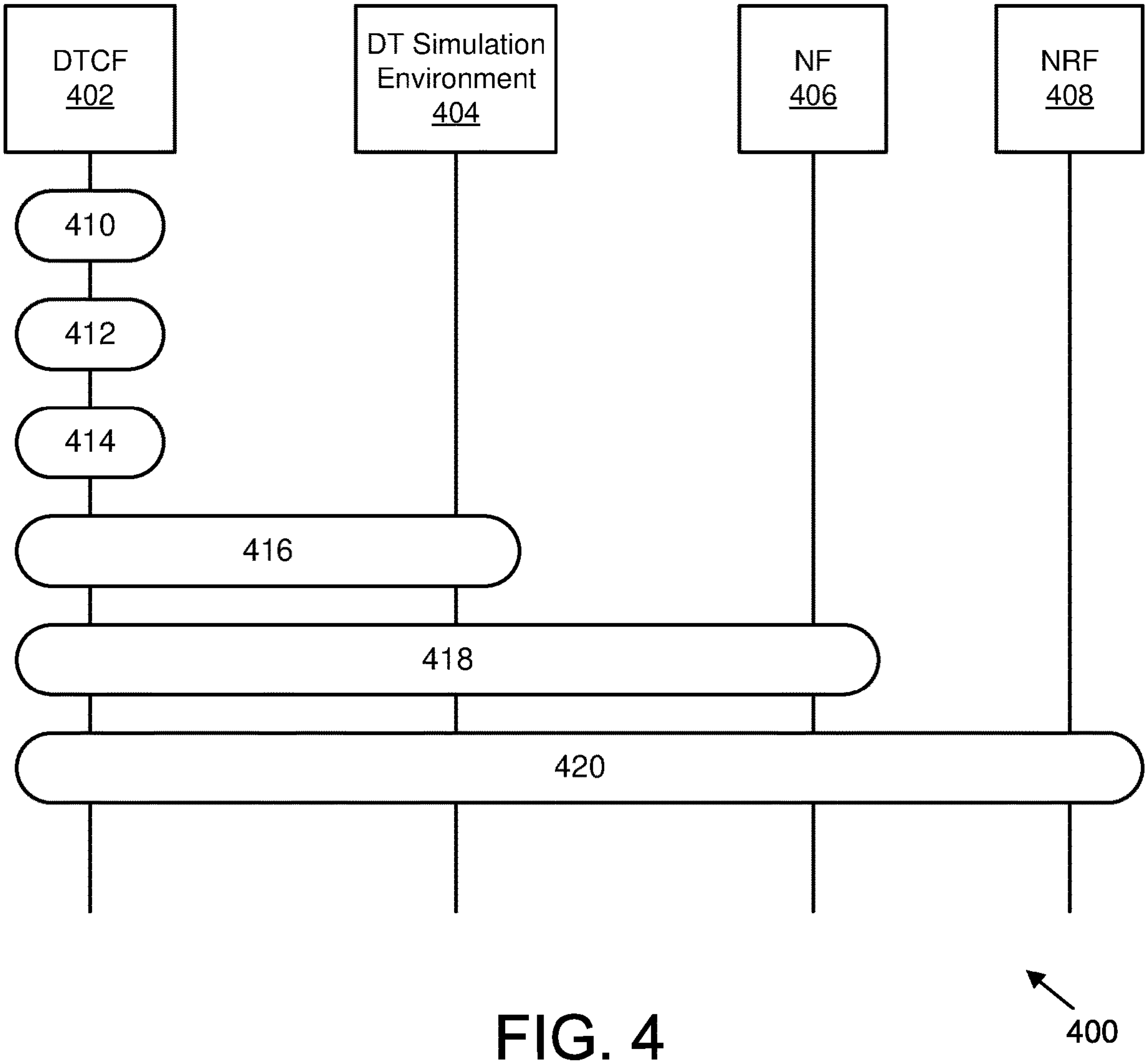
FIG. 4 depicts one embodiment of a procedure flow for creating a digital twin instance for additional data collection.

In one embodiment, the DTCF creates digital twin instances based on a pre-configuration or based on a configuration provided by an OAM. In one embodiment, other network functions may request creation of a digital twin instances. In one embodiment, the DTCF invokes a digital twin as shown in FIG. 4 (creating digital twin NF as an example). FIG. 4 depicts a procedure 400 for creating a digital twin instance for additional data collection. The procedure 400 includes a DTCF 402, a digital twin simulation environment 404, an NF 406, and an NRF 408.

At step 1 (see block 410), in one embodiment, the DTCF 402 receives a request to create a digital twin for an NF type (e.g., AMF, SMF) or a slice type (e.g., S-NSSAI). The request may come from the OAM, the NAF, or a data collection coordination function ("DCCF"), described below. The request may include specific simulation parameters (e.g., number of UEs served, number of MM/SM sessions, and/or the like). The request may be received by a new SBI including an identifier to describe the type of digital twin required (e.g., AMF twin, SMF twin, slice instance twin, and/or the like).

At step 2 (see block 412), in one embodiment, the DTCF 402 determines the AI/ML model required to run the digital twin instances. The DTCF 402 may interact with a ML model provider function to receive the required model.

At step 3 (see block 414), in one embodiment, according to the request in step 1, the DTCF 402 determines the physical NF 406 to obtain real time data in order to run the digital twin instance. For example, if the request is to run an AMF type for a specific "physical" AMF, the DTCF 402 collects data from the physical AMF.

At step 4 (see block 416), in one embodiment, the DTCF 402 creates the digital twin instance.

At step 5 (see block 418), in one embodiment, the DTCF 402 obtains real time data from the identified physical NFs 406. In this embodiment, the DTCF 402 interfaces with the digital twin instance with a procedure not described in 3GPP e.g., (a procedure that is implementation based). In an alternative embodiment, the digital twin instance may directly interact with the physical instance to obtain real time data.

At step 6 (see block 420), in one embodiment, the DTCF 402 registers the created digital twin instance with the NRF 408. The DTCF 402, in one embodiment, may also request instantiation of a digital twin of a UE to receive missing samples. In such an embodiment, the procedures described in FIG. 4 may be the same except where the NF 406 is replaced by a UE.

In an alternative embodiment, the consumer of a DTCF can be a DCCF. The DCCF may determine that the data requested by a consumer may not be available (either historical data or real time data). The DCCF in that case may request the DTCF to run a digital twin instance in order to obtain the required data. In an alternative embodiment, the consumer may also include an indication that data is allowed to be obtained from a digital twin data producer.

Figure 5:
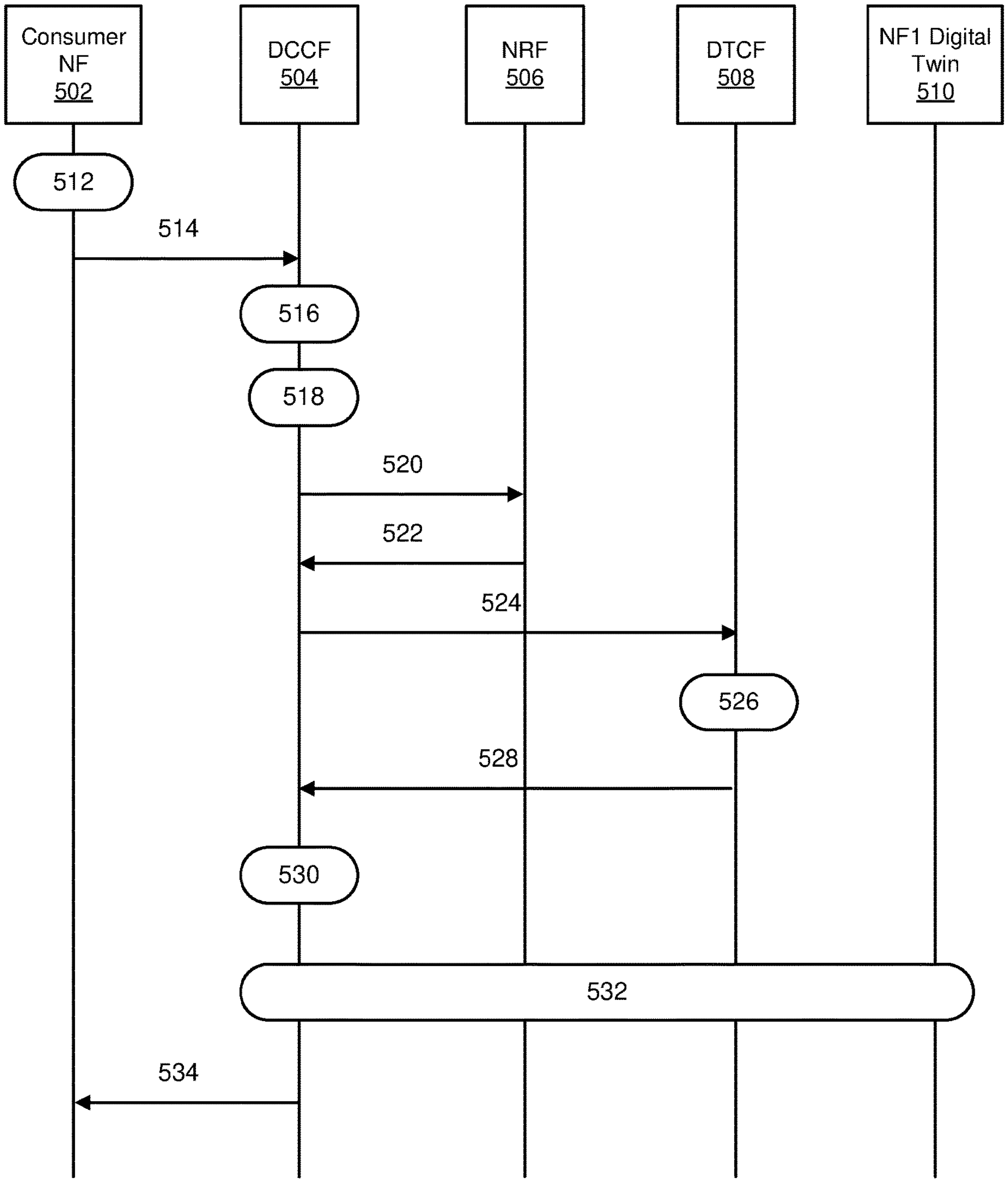
FIG. 5 depicts one embodiment of a procedure flow for data collection from a digital twin instance.

FIG. 5 depicts a procedure 500 for data collection from a digital twin. The procedure 500 includes a consumer NF 502, an DCCF 504, an NRF 506, a DTCF 508, and an NF1 Digital Twin 510 (digital twin of a physical NF1).

At step 1 (see block 512), in one embodiment, a consumer NF 502 determines that it needs analytics with a specific confidence level.

At step 2 (see messaging 514), in one embodiment, the consumer NF 502 requests analytics from the DCCF 504. The data may be identified by a specific Event ID, e.g., as described in 3GPP TS 23.288.

At step 3 (see block 516), in one embodiment, the DCCF 504 determines that data for the Event ID are not available. This may be due, e.g., for privacy reasons that the Data Producer NF cannot report the data.

At step 4 (see block 518), in one embodiment, the DCCF 504 determines if there are available digital twin instances of the Data producer NF instances in order to collect additional samples for missing data.

At step 5 (see messaging 520), in one embodiment, the DCCF 504 interfaces with an NRF 506 to discover a DTCF 508 that has an available digital twin NF Instance/Slice instance. The DCCF 504 may include in the request the NF type or slice type required for the digital twin.

At step 6 (see messaging 522), in one embodiment, the NRF 506 checks if there is a DTCF 508 that supports the digital twin instance required. The DTCF 508 registers to the NRF 506 the available digital twin instances (e.g., the DTCF 508 has already configured simulation model for such digital twin instances).

At step 7 (see messaging 524), in one embodiment, the DCCF 504 interfaces with the DTCF 508 and requests the DTCF 508 via a new SBI to run a digital twin instance with specific simulation parameters (e.g., assume specific number of UEs served, specific number of MM or SM sessions active, and/or the like). The NAF determines the simulation parameters according to the missing data to achieve the required confidence level.

At step 8 (see block 526), in one embodiment, the DTCF 508 runs the digital twin instance 510 according to the simulation parameters.

At step 9, (see messaging 528), in one embodiment, the DTCF 508 responds to the DCCF 504 with the identifier for the digital twin instance.

At step 10 (see block 530), in one embodiment, the DCCF 504 maps the digital twin instance ID to the physical instance of the corresponding NF.

At step 11 (see block 532), in one embodiment, the DCCF 504 obtains data from the digital twin instance 510 using a data collection procedure, e.g., as defined in 3GPP TS 23.288. In an alternative embodiment, the DCCF 504 interacts with the DTCF 508 in order to obtain data for a digital twin instance 510. In such a scenario, the DTCF 508 interfaces with the digital twin instance 510 with a procedure not described in 3GPP (e.g., a procedure that is implementation based).

At step 12 (see messaging 534), in one embodiment, the DCCF 504 reports the data to the consumer NF 502 or stores the data, e.g., in an analytics data repository function ("ADRF").

The DCCF 504 may also request instantiation of a digital twin of a UE to receive missing samples. In such an embodiment, the procedure described in FIG. 5 is the same except where the NF is replaced by a UE. In an alternative embodiment, instead of using a digital twin instance of an NF, a consumer NF 502 may request a digital twin instance of core network, e.g., a slice instance.

In a second embodiment, the digital twin instances can be utilized by a consumer to determine the confidence level provided by a network analytics function. In one embodiment, the consumer may be the network analytics functions in order to derive the confidence level of an analytic prediction. For example, when a network data analytics function derives an analytics predictions for load for an NF instance, the function may instantiate a digital instance of the NF instance to determine the accuracy of the prediction.

In general, the DTCF, as described above in embodiment 1, is utilized to request/identify digital twin instance of a physical NF instance. In one embodiment, the procedure shown in FIG. 4 is used for the DTCF to instantiate digital twin instances.

Figure 6:
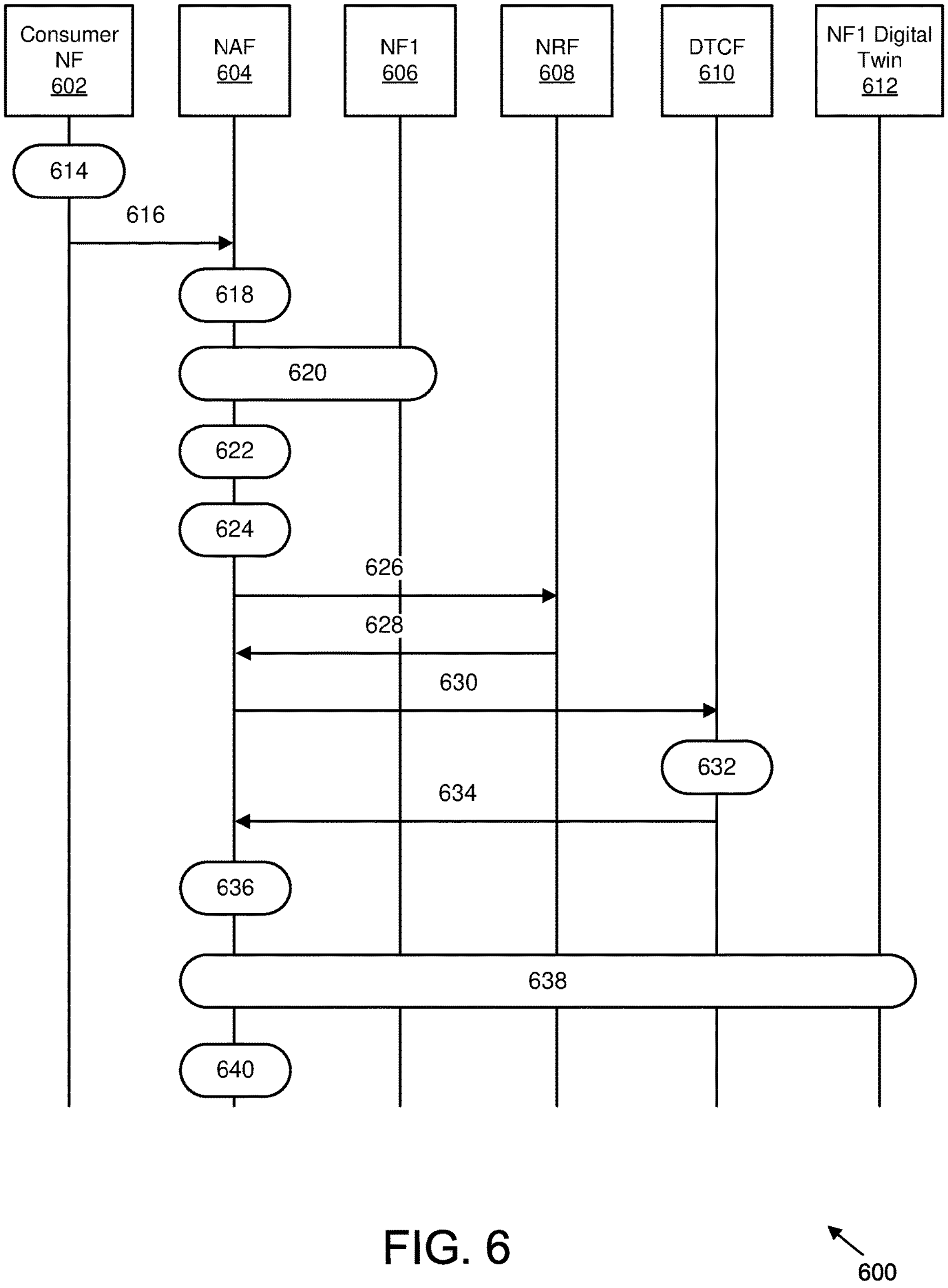
FIG. 6 depicts one embodiment of a procedure flow for utilizing a digital twin for analytics feedback.

FIG. 6 shows the procedure 600 for utilizing a digital twin for analytics feedback. In one embodiment, the procedure 600 includes a consumer NF 602, an NAF 604, an NF1 606 (physical NF), an NRF 608, a DTCF 610, and an NF1 Digital Twin 612 (digital twin of physical NF1).

At step 1 (see block 614), in one embodiment, a consumer NF 602 determines that it needs analytics with a specific confidence level.

At step 2 (see messaging 616), in one embodiment, the consumer NF 602 requests analytics from the NAF 604. The request may include a specific confidence level to be reached/satisfied before the NAF 604 provides the analytics. The consumer NF 602 may also include a time period/time frame when these analytics are required for delivery. The request may also include an indication for analytics feedback that is used by the network analytics function to determine if a digital twin instance is required to be invoked.

At steps 3 and 4 (see blocks 618 and 620), in one embodiment, the NAF 604 collects the data required for the analytics by subscribing to corresponding Event IDs, e.g., as described in 3GPP TS 23.288.

At step 5 (see block 622), in one embodiment, the NAF 604 determines to derive a confidence level from a digital twin instance 612 or alternatively derives a confidence level and requests feedback from the digital twin instance 612 to confirm that the prediction is correct.

At step 6 (see block 624), in one embodiment, the NAF 304 determines if there are available digital twin instances 612 of the data producer NF instances in order to collect additional samples for missing data.

At step 7 (see messaging 626), in one embodiment, the NAF 604 interfaces with an NRF 608 to discover a DTCF 610 that has an available digital twin NF instance/slice instance 612. The NAF 604, in one embodiment, includes in the request the NF type or slice type required for the digital twin 612.

At step 8 (see messaging 628), in one embodiment, the NRF 608 checks if there is a DTCF 610 that supports the digital twin instance required. The DTCF 610, in one embodiment, registers to the NRF 608 the available digital twin instances, e.g., the DTCF 610 has already configured simulation models for such digital twin instances.

At step 9, (see messaging 630), in one embodiment, the NAF 304 interfaces with the DTCF 310 and requests the DTCF 310 via a new service based interface ("SBF") to run a digital twin instance with specific simulation parameters (e.g., assuming a specific number of UEs served, a specific number of MM or SM sessions active, and/or the like). The NAF 604, in one embodiment, determines the simulation parameters according to the missing data to achieve the required confidence level.

At step 10 (see block 632), in one embodiment, the DTCF 610 runs the digital twin instance 612 according to the simulation parameters At step 11 (see messaging 634), in one embodiment, the DTCF 610 responds to the NAF 304 with an identifier for the digital twin instance 612.

At step 12 (see block 636), in one embodiment, the NAF 604 maps the digital twin instance ID to the physical instance of the network function 606.

At step 13 (see block 638), in one embodiment, the NAF 604 obtains data from the digital twin instance 612 using a data collection procedure, e.g., the data collection procedure defined in 3GPP TS 23.288. In an alternative embodiment the NAF 604 interacts with the DTCF 610 in order to obtain data for a digital twin instance 612. In such a scenario, the DTCF 610 interfaces with the digital twin instance 612 with a procedure not described in 3GPP (e.g., a procedure that is implementation based).

At step 14 (see block 640), in one embodiment, the NAF 604 derives analytics with the required confidence level using the additional data obtained from the digital twin instance 612 and/or receives feedback whether the predicted confidence level is accurate.

In one embodiment, the consumer may also request a digital twin instance 612 to validate the accuracy of an analytics prediction. In such case, the procedure in FIG. 6 is used with the network analytics function in steps 5-13 being replaced by a consumer NF. In an alternative embodiment, instead of requesting a digital twin instance of an NF, a consumer may request a digital twin instance of a core network, e.g., a slice instance.

Figure 7:
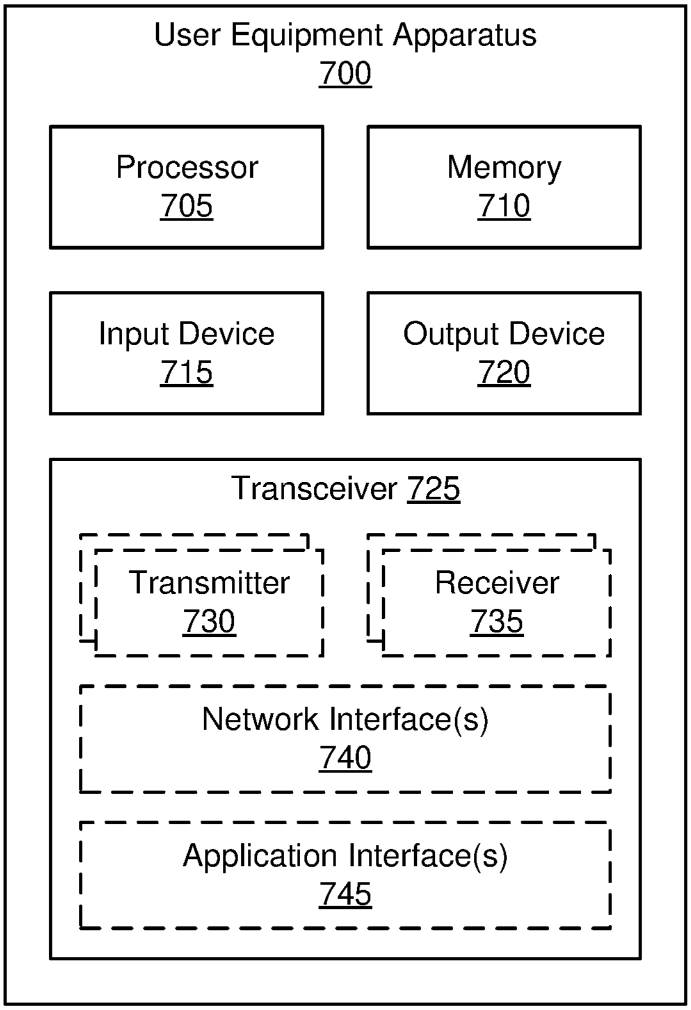
FIG. 7 is a block diagram illustrating one embodiment of a user equipment apparatus that may be used for improving confidence of network analytics using a digital twin.

FIG. 7 depicts a user equipment apparatus 700 that may be used for improving confidence of network analytics using a digital twin, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panel supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to improving confidence of network analytics using a digital twin. For example, the memory 710 may store various parameters, panel/beam configurations, resource assignments, policies, and the like as described above. In certain embodiments, the memory 710 also stores program code and related data, such as an operating system or other controller algorithms operating on the user equipment apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
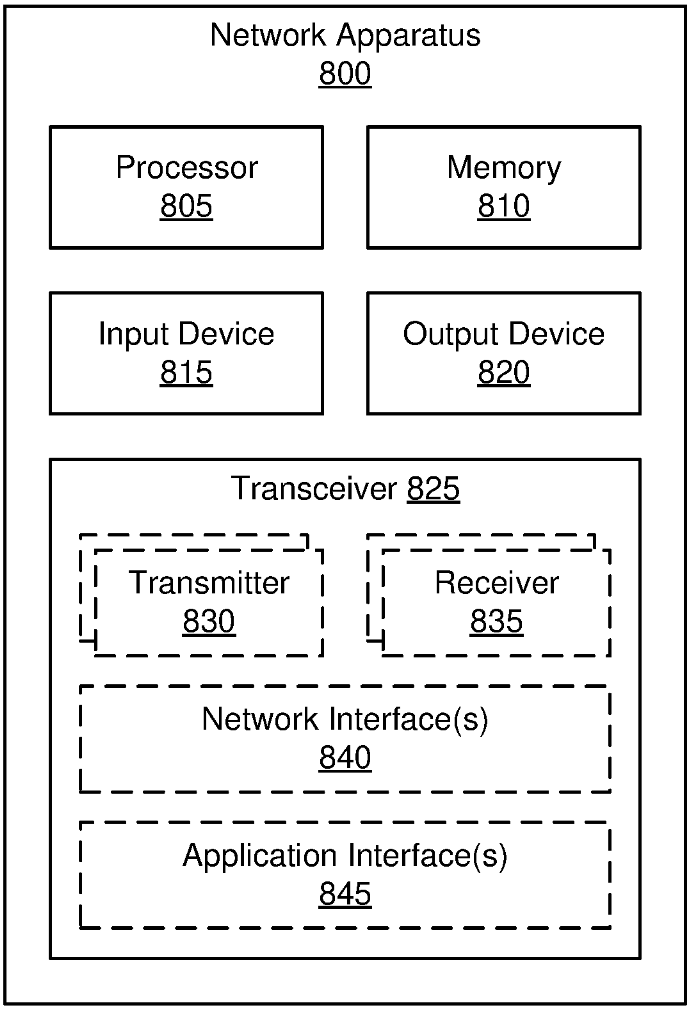
FIG. 8 is a block diagram illustrating one embodiment of a network apparatus that may be used for improving confidence of network analytics using a digital twin.

FIG. 8 depicts a network apparatus 800 that may be used for improving confidence of network analytics using a digital twin, according to embodiments of the disclosure. In one embodiment, network apparatus 800 may be one implementation of a RAN node, such as the base unit 121, the RAN node 210, or gNB, described above. Furthermore, the base network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio function.

In one embodiment, the transceiver 825 receives a request for analytics associated with a mobile wireless communication network, the request comprising a threshold minimum confidence level for the analytics and a specified time period for delivering the analytics.

In one embodiment, the processor 805, in response to determining that the threshold minimum confidence level cannot be met, determines a set of additional data to use for satisfying the threshold minimum confidence level, the set of additional data available from a set of physical network resources.

In one embodiment, the processor 805 determines that the set of additional data from the set of physical network resources is available from at least one digital twin instance.

In one embodiment, the transceiver 825 receives the set of additional data from the at least one digital twin instance in response to transmitting a request for the set of additional data from the at least one digital twin instance.

In one embodiment, the transceiver 825 delivers the analytics at the specified time period in response to the analytics, derived based on the set of additional data from the at least one digital twin instance, satisfying the threshold minimum confidence level.

In one embodiment, the processor 805 requests, from a network repository function ("NRF"), a digital twin controller function ("DTCF") that supports the available at least one digital twin instance.

In one embodiment, the processor 805 queries the DTCF for the at least one digital twin instance that is available to provide the set of additional data. In one embodiment, the query for the DTCF comprises a request to instantiate a digital twin for one or more of a specific network function type, a network slice, and a user equipment device to receive the set of additional data.

In one embodiment, the processor 805 requests to execute the at least one digital twin instance with one or more simulation parameters for generating the set of additional data.

In one embodiment, the transceiver 825 receives the set of additional data from the at least one digital twin instance in response to the DTCF executing the at least one digital twin instance according to the one or more simulation parameters and receiving, from the DTCF, an identifier for the at least one digital twin instance.

In one embodiment, the processor 805 maps the received identifier for the at least one digital twin instance to the physical instance of the corresponding network function.

In one embodiment, the processor 805 derives the analytics at the specified time period in response to the analytics, derived based on the set of additional data from the at least one digital twin instance, satisfying the threshold minimum confidence level.

In one embodiment, the transceiver 825 receives the set of additional data from the at least one digital twin instance via the DTCF. In one embodiment, the at least one parameter is derived from the determined set of additional data. In one embodiment, a digital twin instance comprises a virtualized simulation of a corresponding physical resource.

In one embodiment, the transceiver 825 receives analytics in response to requesting for analytics associated with a mobile wireless communication network, the request comprising a threshold minimum confidence level for the analytics.

In one embodiment, the processor 805 determines an accuracy of a confidence level of the requested analytics by invoking one or more digital twin instances.

In one embodiment, the processor 805 determines a set of data available from the one or more digital twin instances for use in verifying the determined accuracy of the confidence level of the requested analytics.

In one embodiment, the transceiver 825 receives the set of additional data from the one or more digital twin instances in response to transmitting a request for the set of additional data from the one or more digital twin instances.

In one embodiment, the processor 805 verifies the accuracy of the determined confidence level of the requested analytics based on the received set of additional data from the one or more digital twin instances.

In one embodiment, the processor 805 derives the accuracy of the analytics by comparing the received analytics with the received additional data from the one or more digital twin instances.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to improving confidence of network analytics using a digital twin. For example, the memory 810 may store parameters, configurations, resource assignments, policies, and the like, as described above. In certain embodiments, the memory 810 also stores program code and related data, such as an operating system or other controller algorithms operating on the network apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the NPN, PLMN and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
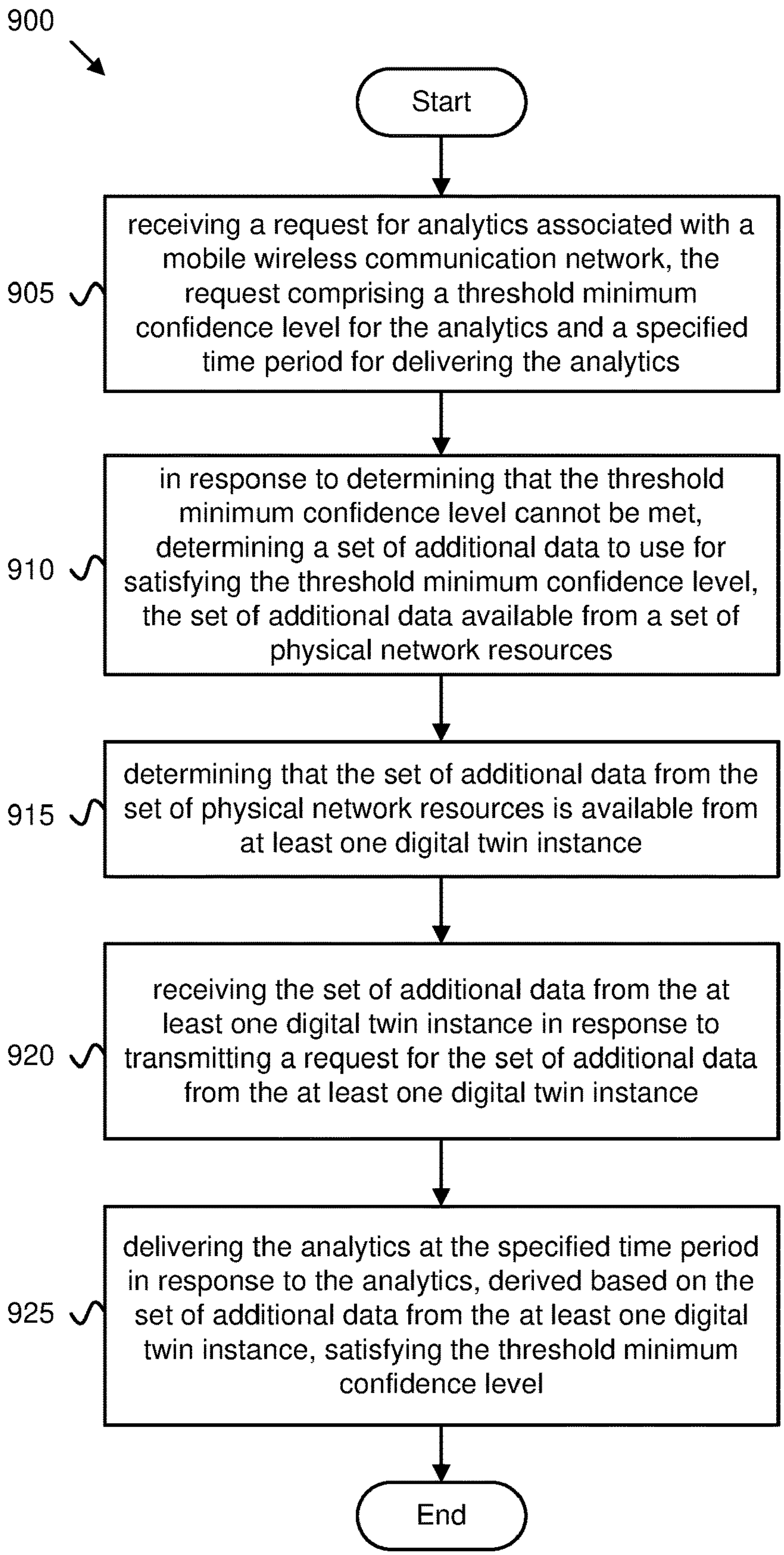
FIG. 9 is a flowchart diagram illustrating one embodiment of a method for improving confidence of network analytics using a digital twin.

FIG. 9 is a flowchart diagram of a method 900 for improving confidence of network analytics using a digital twin. The method 900 may be performed by a network function as described herein, for example, the network analytics function 180, digital twin controller function 182, the data collection controller function, and/or the like located on a network equipment apparatus 800. In some embodiments, the method 900 may be performed by a processor executing program code, for example, a microcontroller, a microprocessor, a CPU, a GPU, an auxiliary processing unit, a FPGA, or the like.

The method 900, in one embodiment, includes receiving 905 a request for analytics associated with a mobile wireless communication network, the request comprising a threshold minimum confidence level for the analytics and a specified time period for delivering the analytics. In one embodiment, the method 900 includes, in response to determining that the threshold minimum confidence level cannot be met, determining 910 a set of additional data to use for satisfying the threshold minimum confidence level, the set of additional data available from a set of physical network resources. In one embodiment, the method 900 includes determining 915 that the set of additional data from the set of physical network resources is available from at least one digital twin instance. In one embodiment, the method 900 includes receiving 920 the set of additional data from the at least one digital twin instance in response to transmitting a request for the set of additional data from the at least one digital twin instance. In one embodiment, the method 900 includes delivering 925 the analytics at the specified time period in response to the analytics, derived based on the set of additional data from the at least one digital twin instance, satisfying the threshold minimum confidence level. The method 900 ends.

Figure 10:
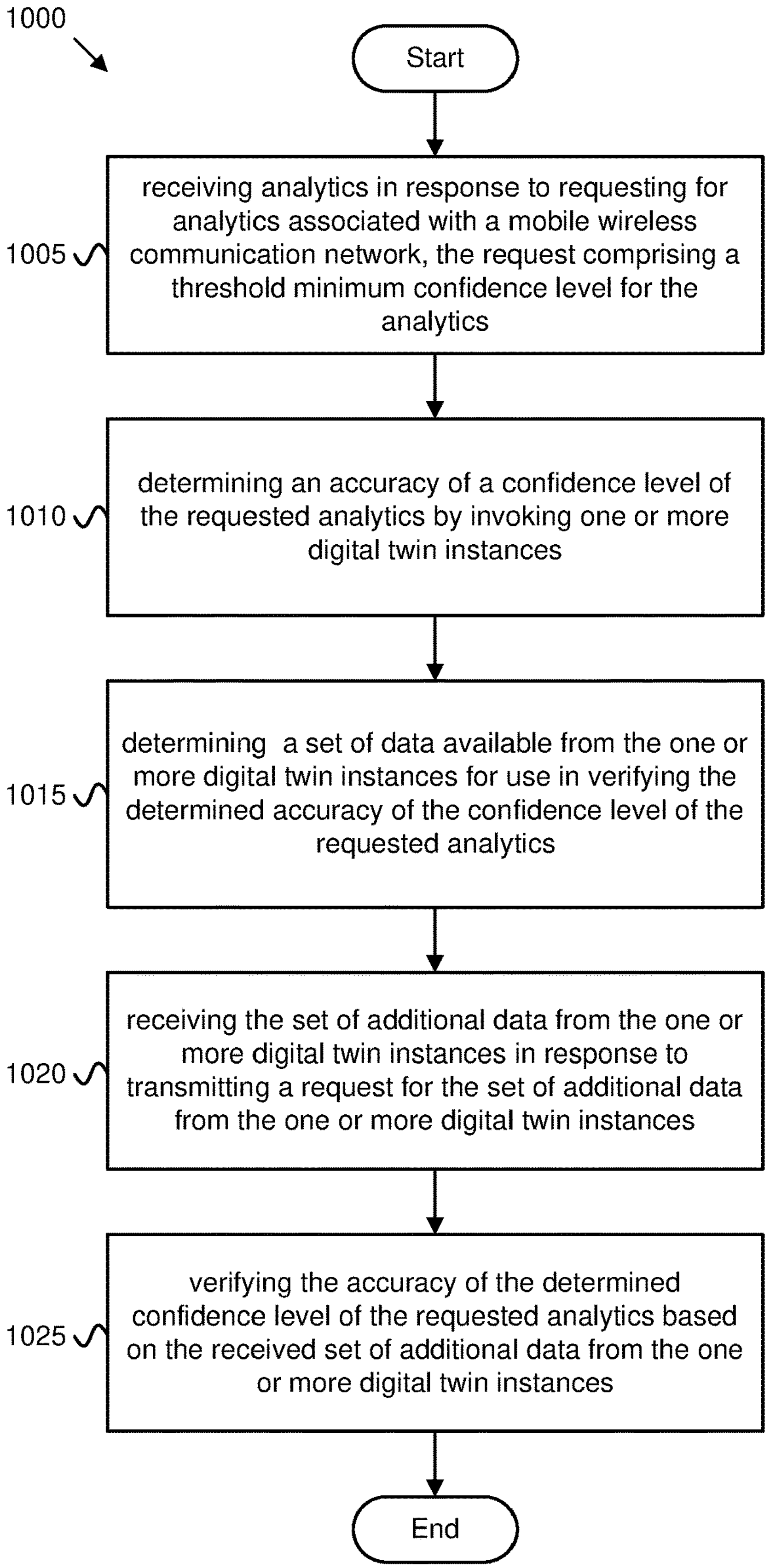
FIG. 10 is a flowchart diagram illustrating one embodiment of another method for improving confidence of network analytics using a digital twin.

FIG. 10 is a flowchart diagram of a method 1000 for improving confidence of network analytics using a digital twin. The method 1000 may be performed by a network function as described herein, for example, the network analytics function 180, digital twin controller function 182, the data collection controller function, and/or the like located on a network equipment apparatus 800. In some embodiments, the method 1000 may be performed by a processor executing program code, for example, a microcontroller, a microprocessor, a CPU, a GPU, an auxiliary processing unit, a FPGA, or the like.

The method 1000, in one embodiment, includes receiving 1005 analytics in response to requesting for analytics associated with a mobile wireless communication network, the request comprising a threshold minimum confidence level for the analytics. In one embodiment, the method 1000 includes determining 1010 an accuracy of a confidence level of the requested analytics by invoking one or more digital twin instances. The method 1000, in one embodiment, includes determining 1015 a set of data available from the one or more digital twin instances for use in verifying the determined accuracy of the confidence level of the requested analytics. The method 1000, in one embodiment, includes receiving 1020 the set of additional data from the one or more digital twin instances in response to transmitting a request for the set of additional data from the one or more digital twin instances. In one embodiment, the method 1000 includes verifying 1025 the accuracy of the determined confidence level of the requested analytics based on the received set of additional data from the one or more digital twin instances, and the method 1000 ends.

A first method is disclosed for improving confidence of network analytics using a digital twin. The first method may be performed by a network function as described herein, for example, the network analytics function 180, digital twin controller function 182, the data collection controller function, and/or the like located on a network equipment apparatus 800. In some embodiments, the first method may be performed by a processor executing program code, for example, a microcontroller, a microprocessor, a CPU, a GPU, an auxiliary processing unit, a FPGA, or the like.

In one embodiment, the first method includes receiving a request for analytics associated with a mobile wireless communication network, the request comprising a threshold minimum confidence level for the analytics and a specified time period for delivering the analytics.

In one embodiment, the first method includes, in response to determining that the threshold minimum confidence level cannot be met, determining a set of additional data to use for satisfying the threshold minimum confidence level, the set of additional data available from a set of physical network resources.

In one embodiment, the first method includes determining that the set of additional data from the set of physical network resources is available from at least one digital twin instance.

In one embodiment, the first method includes receiving the set of additional data from the at least one digital twin instance in response to transmitting a request for the set of additional data from the at least one digital twin instance.

In one embodiment, the first method includes delivering the analytics at the specified time period in response to the analytics, derived based on the set of additional data from the at least one digital twin instance, satisfying the threshold minimum confidence level.

In one embodiment, the first method includes requesting, from a network repository function ("NRF"), a digital twin controller function ("DTCF") that supports the available at least one digital twin instance.

In one embodiment, the first method includes querying the DTCF for the at least one digital twin instance that is available to provide the set of additional data. In one embodiment, the query for the DTCF comprises a request to instantiate a digital twin for one or more of a specific network function type, a network slice, and a user equipment device to receive the set of additional data.

In one embodiment, the first method includes requesting to execute the at least one digital twin instance with one or more simulation parameters for generating the set of additional data.

In one embodiment, the first method includes receiving the set of additional data from the at least one digital twin instance in response to the DTCF executing the at least one digital twin instance according to the one or more simulation parameters and receiving, from the DTCF, an identifier for the at least one digital twin instance.

In one embodiment, the first method includes mapping the received identifier for the at least one digital twin instance to the physical instance of the corresponding network function.

In one embodiment, the first method includes deriving the analytics at the specified time period in response to the analytics, derived based on the set of additional data from the at least one digital twin instance, satisfying the threshold minimum confidence level.

In one embodiment, the first method includes receiving the set of additional data from the at least one digital twin instance via the DTCF. In one embodiment, the at least one parameter is derived from the determined set of additional data. In one embodiment, a digital twin instance comprises a virtualized simulation of a corresponding physical resource.

A first apparatus is disclosed for improving confidence of network analytics using a digital twin. The first apparatus may include a network function as described herein, for example, the network analytics function 180, digital twin controller function 182, the data collection controller function, and/or the like located on a network equipment apparatus 800. In some embodiments, the first apparatus may include a processor executing program code, for example, a microcontroller, a microprocessor, a CPU, a GPU, an auxiliary processing unit, a FPGA, or the like In one embodiment, the first apparatus includes a transceiver that receives a request for analytics associated with a mobile wireless communication network, the request comprising a threshold minimum confidence level for the analytics and a specified time period for delivering the analytics.

In one embodiment, the first apparatus includes a processor that, in response to determining that the threshold minimum confidence level cannot be met, determines a set of additional data to use for satisfying the threshold minimum confidence level, the set of additional data available from a set of physical network resources.

In one embodiment, the processor determines that the set of additional data from the set of physical network resources is available from at least one digital twin instance.

In one embodiment, the transceiver receives the set of additional data from the at least one digital twin instance in response to transmitting a request for the set of additional data from the at least one digital twin instance.

In one embodiment, the transceiver delivers the analytics at the specified time period in response to the analytics, derived based on the set of additional data from the at least one digital twin instance, satisfying the threshold minimum confidence level.

In one embodiment, the processor requests, from a network repository function ("NRF"), a digital twin controller function ("DTCF") that supports the available at least one digital twin instance.

In one embodiment, the processor queries the DTCF for the at least one digital twin instance that is available to provide the set of additional data. In one embodiment, the query for the DTCF comprises a request to instantiate a digital twin for one or more of a specific network function type, a network slice, and a user equipment device to receive the set of additional data.

In one embodiment, the processor requests to execute the at least one digital twin instance with one or more simulation parameters for generating the set of additional data.

In one embodiment, the transceiver receives the set of additional data from the at least one digital twin instance in response to the DTCF executing the at least one digital twin instance according to the one or more simulation parameters and receiving, from the DTCF, an identifier for the at least one digital twin instance.

In one embodiment, the processor maps the received identifier for the at least one digital twin instance to the physical instance of the corresponding network function.

In one embodiment, the processor derives the analytics at the specified time period in response to the analytics, derived based on the set of additional data from the at least one digital twin instance, satisfying the threshold minimum confidence level.

In one embodiment, the transceiver receives the set of additional data from the at least one digital twin instance via the DTCF. In one embodiment, the at least one parameter is derived from the determined set of additional data. In one embodiment, a digital twin instance comprises a virtualized simulation of a corresponding physical resource.

A second method is disclosed for improving confidence of network analytics using a digital twin. The second method may be performed by a network function as described herein, for example, the network analytics function 180, digital twin controller function 182, the data collection controller function, and/or the like located on a network equipment apparatus 800. In some embodiments, the second method may be performed by a processor executing program code, for example, a microcontroller, a microprocessor, a CPU, a GPU, an auxiliary processing unit, a FPGA, or the like.

In one embodiment, the second method includes receiving analytics in response to requesting for analytics associated with a mobile wireless communication network, the request comprising a threshold minimum confidence level for the analytics.

In one embodiment, the second method includes determining an accuracy of a confidence level of the requested analytics by invoking one or more digital twin instances.

In one embodiment, the second method includes determining a set of data available from the one or more digital twin instances for use in verifying the determined accuracy of the confidence level of the requested analytics.

In one embodiment, the second method includes receiving the set of additional data from the one or more digital twin instances in response to transmitting a request for the set of additional data from the one or more digital twin instances.

In one embodiment, the second method includes verifying the accuracy of the determined confidence level of the requested analytics based on the received set of additional data from the one or more digital twin instances.

In one embodiment, the second method includes deriving the accuracy of the analytics by comparing the received analytics with the received additional data from the one or more digital twin instances.

In one embodiment, the second method includes predicting an accuracy of the confidence level of the requested analytics and sending the predicted accuracy to the one or more digital twin instances to verify the accuracy of the prediction.

A second apparatus is disclosed for improving confidence of network analytics using a digital twin. The second apparatus may include a network function as described herein, for example, the network analytics function 180, digital twin controller function 182, the data collection controller function, and/or the like located on a network equipment apparatus 800. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that receives analytics in response to requesting for analytics associated with a mobile wireless communication network, the request comprising a threshold minimum confidence level for the analytics.

In one embodiment, the second apparatus includes a processor that determines an accuracy of a confidence level of the requested analytics by invoking one or more digital twin instances.

In one embodiment, the processor determines a set of data available from the one or more digital twin instances for use in verifying the determined accuracy of the confidence level of the requested analytics.

In one embodiment, the transceiver receives the set of additional data from the one or more digital twin instances in response to transmitting a request for the set of additional data from the one or more digital twin instances.

In one embodiment, the processor verifies the accuracy of the determined confidence level of the requested analytics based on the received set of additional data from the one or more digital twin instances.

In one embodiment, the processor derives the accuracy of the analytics by comparing the received analytics with the received additional data from the one or more digital twin instances.

In one embodiment, the processor predicts an accuracy of the confidence level of the requested analytics and sending the predicted accuracy to the one or more digital twin instances to verify the accuracy of the prediction.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network equipment (NE), comprising:

receiving a request for analytics associated with a wireless communication network, the request comprising a threshold minimum confidence level for the analytics and a time period for delivering the analytics;

in response to determining, based on data collected based on a set of physical network resources, that the threshold minimum confidence level cannot be met within the time period, determining a set of additional data to use for satisfying the threshold minimum confidence level, the set of additional data corresponding to one or more physical network resources of the set of physical network resources;

determining that the set of additional data is obtainable from at least one digital twin instance configured to simulate the one or more physical network resources;

receiving the set of additional data from the at least one digital twin instance in response to transmitting, to the at least one digital twin instance, a request for the set of additional data from the at least one digital twin instance; and delivering the analytics at the time period in response to the analytics, derived based on the set of additional data from the at least one digital twin instance, satisfying the threshold minimum confidence level.

2. The method of claim 1, further comprising requesting, from a network repository function ("NRF"), a digital twin controller function ("DTCF") that supports the at least one digital twin instance.

3. The method of claim 2, further comprising transmitting a query to the DTCF for the at least one digital twin instance that is available to provide the set of additional data.

4. The method of claim 3, wherein the query for the DTCF comprises a request to instantiate a digital twin for one or more of a specific network function type, a network slice, and a user equipment device to receive the set of additional data.

5. The method of claim 4, further comprising requesting to execute the at least one digital twin instance with one or more simulation parameters for generating the set of additional data.

6. The method of claim 5, further comprising receiving the set of additional data from the at least one digital twin instance in response to the DTCF executing the at least one digital twin instance according to the one or more simulation parameters and receiving, from the DTCF, an identifier for the at least one digital twin instance.

7. The method of claim 6, further comprising mapping the identifier for the at least one digital twin instance to a physical instance of a corresponding network function.

8. The method of claim 6, further comprising deriving the analytics at the time period in response to the analytics, derived based on the set of additional data from the at least one digital twin instance, satisfying the threshold minimum confidence level.

9. The method of claim 5, further comprising receiving the set of additional data from the at least one digital twin instance via the DTCF.

10. The method of claim 5, wherein the one or more simulation parameters are derived from the set of additional data.

11. The method of claim 1, wherein the at least one digital twin instance comprises a virtualized simulation of a corresponding physical resource.

12. A network equipment (NE), comprising:

at least one memory; and at least one processor coupled with the at least one memory and configured to cause the NE to:

receive a request for analytics associated with a wireless communication network, the request comprising a threshold minimum confidence level for the analytics and a time period for delivering the analytics;

in response to determining, based on data collected based on a set of physical network resources, that the threshold minimum confidence level cannot be met within the time period, determine a set of additional data to use for satisfying the threshold minimum confidence level, the set of additional data corresponding to one or more physical network resources of the set of physical network resources;

determine that the set of additional data is obtainable from at least one digital twin instance configured to simulate the one or more physical network resources;

receive the set of additional data from the at least one digital twin instance in response to transmitting, to the at least one digital twin instance, a request for the set of additional data from the at least one digital twin instance; and deliver the analytics at the time period in response to the analytics, derived based on the set of additional data from the at least one digital twin instance, satisfying the threshold minimum confidence level.

13. The NE of claim 12, wherein the at least one processor is configured to cause the NE to request, from a network repository function ("NRF"), a digital twin controller function ("DTCF") that supports the at least one digital twin instance.

14. The NE of claim 13, wherein the at least one processor is configured to cause the NE to transmit a query to the DTCF for the at least one digital twin instance that is available to provide the set of additional data.

15. The NE of claim 14, wherein the query for the DTCF comprises a request to instantiate a digital twin for one or more of a specific network function type, a network slice, and a user equipment device to receive the set of additional data.

16. The NE of claim 15, wherein the at least one processor is configured to cause the NE to request to execute the at least one digital twin instance with one or more simulation parameters for generating the set of additional data.

17. The NE of claim 16, wherein the at least one processor is configured to cause the NE to receive the set of additional data from the at least one digital twin instance in response to the DTCF executing the at least one digital twin instance according to the one or more simulation parameters and receiving, from the DTCF, an identifier for the at least one digital twin instance.

* * * * *